United States Patent

[11] 3,604,291

| [72] | Inventor | August Weidner<br>Los Angeles, Calif. |
|---|---|---|
| [21] | Appl. No. | 792,531 |
| [22] | Filed | Jan. 21, 1969 |
| [45] | Patented | Sept. 14, 1971 |
| [73] | Assignee | Thomas Organ Co., a subsidiary of<br>Warwick Electronics Inc.<br>Chicago, Ill. |

[54] WIRE STRIPPING APPARATUS
2 Claims, 6 Drawing Figs.

| [52] | U.S. Cl. | 81/9.51 |
|---|---|---|
| [51] | Int. Cl. | H02g 1/12 |
| [50] | Field of Search | 81/9.51, 9.5<br>M, 9.5 A |

[56] References Cited
UNITED STATES PATENTS

| 1,787,658 | 1/1931 | Andren et al. | 81/9.51 |
|---|---|---|---|
| 2,929,284 | 3/1960 | Hagstrand | 81/9.51 |

*Primary Examiner*—Robert C. Riordon
*Assistant Examiner*—Roscoe V. Parker, Jr.
*Attorney*—Roger A. Marrs ABSTRACT: A wire-stripping apparatus is disclosed herein having a cutter adapted to sever insulation from the ends of a pair of separate wires preparatory to removal of the severed insulation from each of the wires. Also, the cutter severs a predetermined length of wire from a coil stored on a reel. The apparatus includes a gripping means having a pair of cooperating grippers adapted to clamp about the insulated wires so that the wires are positively retained during the cutting and stripping procedure. Linkage means, including an eccentric pivot connection, actuates the pair of grippers in response to control means for automatically clamping and releasing the pair of wires simultaneously.

PATENTED SEP 14 1971
3,604,291
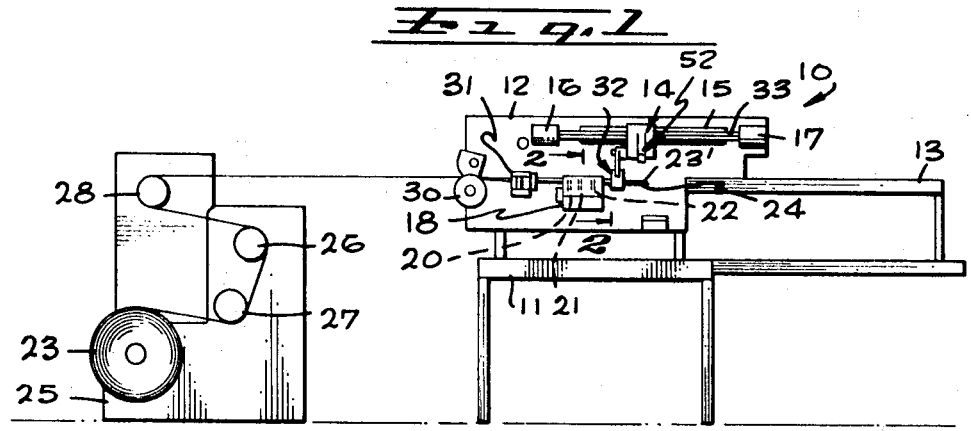
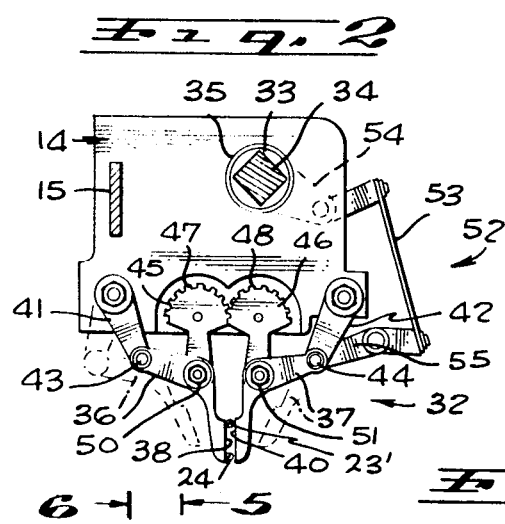
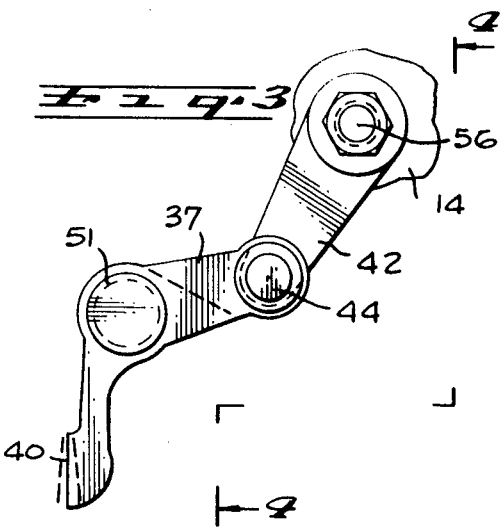
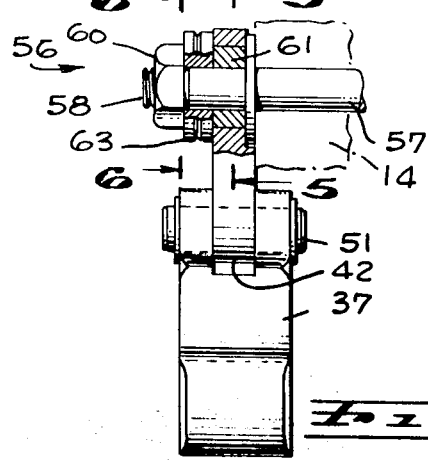
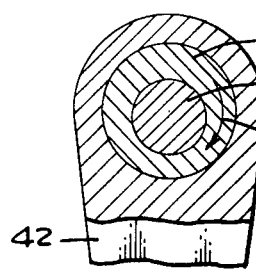
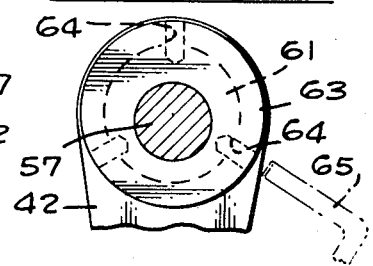
INVENTOR.
AUGUST WEIDNER
BY Roger G. Marrs

WIRE STRIPPING APPARATUS

BACKGROUND OF THE INVENTION

1. Field of the Invention

This invention relates to wire-stripping machines and, more particularly, to a novel wire-gripping means adjustably disposed to clamp against a plurality of insulated wires to hold and maintain the wires in fixed parallel spaced-apart relationship during the cutting and stripping procedure.

2. Description of the Prior Art

Although stripping insulation from electrical wires has been a conventional practice throughout the electronic industry for providing circuit-hookup connections, a need has long existed to sever and strip insulation from the ends of a plurality of wires simultaneously on an automatic, mass-production basis. Several attempts have been made to strip insulation from more than one wire at a time. However, problems and difficulties have been encountered in maintaining the wires parallel with respect to each other while the wire ends are being operated upon by the cutter and stripper mechanisms. This difficulty contributes to erratic machine operation, uncontrolled cutting and stripping of the insulation outside desired limits, and creates a low yield of usable wires for circuit-network hookups. When the wires are not maintained in parallel relationship, unequal holding pressure exists on the wires which generally results in slippage of the wires so that all of the wires are not cut to the same length and the length of insulation removed from each of the wire ends greatly varies from wire to wire. Obviously, such practices produce low quality parts which fail to meet standards and greatly reduce the savings otherwise obtainable by employing mass-production techniques.

SUMMARY OF THE INVENTION

Accordingly, the problems and difficulties encountered with conventional automatic wire-stripping apparatus are obviated by the present invention which provides a novel gripping means operable in conjunction with a cutter to clamp more than one insulated wire together whereby substantially equal clamping pressure is applied to the wires. The clamping means includes a pair of bellcranks having opposing parallel clamping faces adapted to engage with the wires disposed therebetween. The bellcranks are pivotally attached to a support block by connecting links and by a drive translation means comprising interlocking quadrant members rotatably carried on the block and drivingly interconnecting each of the bellcranks. Actuating linkage is operably connected to a selected one of the bellcranks effective to pivot the bellcranks via said translation means to move their respective clamping faces toward and away from each other. Means are provided for pivotally connecting the selected one of the bellcranks to the block by an eccentric mounting whereby the planar axes of the clamping faces may be adjusted with respect to each other so as to maintain parallel relationship.

Therefore, it is among the primary objects of the present invention to provide a novel wire-stripping apparatus having a gripping means adapted to positively clamp a plurality of wires together in substantially fixed parallel spaced-apart relationship.

Another object of the present invention is to provide a novel gripping means for holding a plurality of wires together preparatory to stripping the insulation from the ends thereof and having means for adjusting the clamping faces of the stripping means with respect to one another.

Still another object of the present invention is to provide a novel wire-stripping apparatus having adjustable gripping members including opposing clamping faces that are readily adjustable to ensure a parallel relationship between the opposing faces.

Yet another object of the present invention is to provide a wire-stripping apparatus employing a novel gripping means for holding a plurality of wires so that insulation from the wires may be readily stripped from the ends thereof in accordance with an automatic control means employing mass-production techniques.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a diagrammatic view of an automatic wire-stripping machine for removing insulation from the ends of insulated wires and which incorporates the present invention;

FIG. 2 is an enlarged sectional view of the wire-gripping device of the present invention taken in the direction of arrows 2—2 of FIG. 1;

FIG. 3 is an enlarged front elevational view of a selected one of the wire grippers and actuating linkage therefor included in the wire-stripping machine;

FIG. 4 is a stepped sectional view, partly in side elevation, of the selected gripper shown in FIG. 3 as taken in the direction of arrows 4—4 thereof;

FIG. 5 is a sectional view of the actuator linkage as taken in the direction of arrows 5—5 of FIG. 4; and FIG. 6 is a cross-sectional view of the linkage as taken in the direction of arrows 6—6 of FIG. 4.

DESCRIPTION OF THE PREFERRED EMBODIMENT

In FIG. 1, an automatic wire-stripping machine is indicated in the general direction of arrow 10 which is employed for stripping insulation from the ends of a plurality of wires as well as for severing the wires to a predetermined length. The apparatus 10 includes a support table 11 for supporting a base 12 and a table extension 13. The base 12 is employed to support a gripper block 14 slidably carried on an elongated slide member 15 and an actuator rod 33 carried between fixtures 16 and 17 arranged in fixed spaced-apart relationship on the base 12. The base further supports a cutting mechanism 18, preferably provided with three sets of conventional cutting elements indicated by numerals 20–22 inclusive, adapted to cut a length of wire supplied to the cutter from a reel or spool 23. The wires are indicated by numerals 23' and 24 and are initially stored in a coil form on a pair of coaxial reels rotatably supported in side-by-side relationship on a stand 25. The length of wires are supplied to the cutter mechanism 18 from each of their respective storage reels via a drive roller 26 and idler rollers 27 and 28, respectively. Idler roller 27 may be employed as a tensioning roller for maintaining the length of wire taut during wire-feeding procedures.

The base 12 further supports a pair of guide rollers 30 over which each of the wires 23' and 24 is trained preparatory to straightening by a straightening means 31. The straightening means 31 redirects the pair of wires from guide rollers 30 into vertical alignment in substantially parallel spaced-apart relationship. In this relationship, the wires are introduced to the cutter mechanism 18. The wires are maintained in this relationship by a gripper means 32 movably carried on the block 14.

Although a pair of wires are shown and described in the present application, it is to be noted that additional wires may be supplied from additional reels so that a plurality of wires are introduced through the cutting mechanism to the gripper means 32, if desired.

Once the wires have been cut to a predetermined length and the insulation stripped from the opposite ends of each wire, the finished wires are transferred to the table extension 13 for temporary storage. When a sufficient number of wires have been so processed, they may be manually taken from the table extension 13 and distributed to assembly workers for circuit-hookup purposes in connection with fabrication of electronic equipment.

Referring now in detail to FIG. 2, it can be seen that not only is the gripping means support block 14 slidably carried on slide member 15, but the block is supported on a rod 33 having a square portion 34 carried in a bearing 35 so as to be rotatable with respect to block 14.

The gripping means 32 includes a pair of bellcranks 36 and 37 having clamping faces 38 and 40 arranged in opposing relationship so as to accommodate and clamp the pair of wires 23 and 24 therebetween. The opposite ends of the bellcranks 36 and 37 from their ends formed with clamping faces are pivotally secured to one end of mounting links 41 and 42 which have their opposite ends pivotally attached to the opposite sides of block 14. Thereby, a pivot connection 43 couples one end of mounting link 41 to bellcrank 36 while a pivot connection 44 couples one end of mounting link 42 to bellcrank 37. Additionally, a pair of quadrant members 45 and 46 are rotatably mounted on block 14 so that peripheral teeth 47 and 48 formed on the quadrant members respectively, are caused to intermesh in cooperating, driving relationship. Each of the quadrant members includes an extension having its opposite end pivotally connected to each of the respective bellcranks by means of pivots 50 and 51, respectively.

An actuating linkage is connected between the rod 33 and a selected one of the bellcranks, namely, bellcrank 37, for moving the bellcranks and their respective clamping faces between an open and a closed position. The closed position about the wires 23' and 24 are shown in solid lines while the open position is shown in broken lines. The actuating means is shown in the direction of arrow 52 which includes a bail assembly 53 pivotally connected at one end to a spur link 54 fixed to the rod 33 and an actuator link 55 pivotally connected by pivot 44 to bellcrank 37. To open or separate the clamping faces of the bellcranks, rod 33 is rotated in a clockwise direction which causes spur link 54 to move downwardly and carry with it the upper end of the bail assembly 52. This action causes the lower end of the bail assembly to pivot slightly around one end of the actuator link 55 in a counterclockwise direction which pulls or draws the actuator link 55 outwardly. The outward movement of the link 55 pulls on the end of bellcrank 37 so that the quadrant member 46 connected thereto commences to rotate in a counterclockwise direction. This movement causes the quadrant member 46 to drive quadrant member 45 in a clockwise direction via the interlocking teeth 47 and 48. As the quadrant member 45 is driven in a clockwise direction, bellcrank 36 is pivoted about connection 43 and 50 as the clamping face 38 moves away from the wires. The gripping means is completely opened when the bellcranks are in the dotted line positions as shown. To close the gripping means so that the clamping faces 38 and 40 grip the wires 23' and 24, the rod 33 is rotated in a counterclockwise direction so that the actuator means 52 causes a reversal of the movements immediately described with respect to opening of the gripping means.

Referring now in detail to FIG. 3, it is to be noted that the clamping face 40 carried on bellcrank 37 may be readily adjusted to a desired position with respect to the vertical plane so as to compensate for any alignment differences between the vertical plane and the clamping face 38 carried on bellcrank 36. By the adjustment means, the clamping face 40 may be placed in parallel alignment with the clamping face 38. One position, which is extending in the vertical plane, is shown in solid lines for the clamping face 40. Adjustment of bellcrank 37 may be made so that the clamping face 40 may assume off-center relationship with respect to the vertical plane by means of adjustment of a pivot connection 56 connecting the end of link 42 to the block 14.

Pivot connection 56 is more clearly shown in FIG. 4 which comprises a mounting shaft 57 carried on block 14 which projects ahead of the front face of the block where the shaft is formed with threads 58 adapted to threadably engage with a fastener 60. The end of link 42 is carried on an eccentric cam 61 that is rotatably carried on shaft 57. This relationship is shown in FIG. 5. Therefore, as the eccentric cam 61 is moved in the direction of arrow 62, the link 42 will be moved accordingly in an eccentric manner. As shown in FIGS. 4 and 6, the eccentric cam 61 is integrally formed with an annular collar 63 having a plurality of bores, such as bore 64, radially formed about its periphery. An adjustment tool 65 may be inserted into any one of the bores formed in collar 63 and rotated to position link 42 to a desired location via the rotation of eccentric cam 61. Therefore, it can be seen that by adjusting the position of link 42 relative to the block 14 at pivot connection 56, the bellcrank 37 is positionable so that its clamping face 40 can be adjusted to assume a desired parallel relationship with respect to the clamping face 38 of the bellcrank 36.

In view of the foregoing, it can be seen that a wire-stripping machine having a novel gripping means is provided whereby the opposing clamping surfaces can be readily adjusted to maintain a parallel relationship therebetween. By so maintaining this relationship, equal holding and clamping pressures are applied to a plurality of wires disposed between the opposing clamping faces. Furthermore, by employing the clamping or gripping means of the present invention, the wire-cutting and stripping machine lends itself quite readily to mass-production procedures wherein the production yield is extremely high. Damage to the production lengths of wire is eliminated and reliance may be had on repeated duplications of accurate wire lengths and insulation strippage.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In a wire-stripping and cutting apparatus having
 a cutting means for severing a plurality of wires into predetermined lengths and for cutting insulation from the ends of the wire lengths, the improvement which comprises:
 a gripping means operably carried on said apparatus having a pair of opposing clamping faces separated by said plurality of wires and being settable in an open position out of contact with said wires and in a closed position to clamp and hold said wires in fixed spaced-apart parallel relationship;
 means carried on said apparatus for actuating said gripping means clamping faces into either of said open or said closed positions;
 said clamping faces are broad, flat surfaces in a parallel relationship with respect to each other;
 means included in said gripping means for adjusting a selected one of said clamping faces with respect to the other of said clamping faces to maintain said parallel relationship;
 said gripping means further includes a support block and a pair of bellcranks pivotally carried on said block;
 each of said bellcranks being formed to provide one of said clamping faces;
 means pivotally interconnecting said bellcranks together in driving relationship to effect positioning of said clamping faces between said open and said closed positions in response to said actuating means;
 said adjusting means comprises an eccentric pivot connection coupling said selected bellcrank to said support block;
 means for rotating said eccentric pivot connection relative to said block so that said selected bellcrank-clamping face may be selectively moved with respect to the other bellcrank-clamping face; and
 said interconnecting means comprises a pair of quadrant members having intermeshed peripheral teeth wherein a selected one of said quadrant members drives the other quadrant member in response to said actuating means.

2. A gripping means for holding a plurality of wires in parallel spaced-apart relationship comprising:

a support block;

a pair of bellcranks having flat, parallel spaced-apart and opposing clamping faces defining a space therebetween to receive the plurality of wires;

mounting links pivotally connecting the ends of said bellcranks to said support block;

drive means rotatably carried on said support block and pivotally coupled to said bellcranks for positioning said bellcranks whereby their respective clamping faces are moved between an open position and a closed position to clamp the wires;

actuator means connected to a selected one of said bellcranks for actuating said drive means;

said drive means includes a pair of quadrant members having intermeshed peripheral teeth in driving relationship;

each quadrant member having an integrally formed extension pivotally connected to a respective bellcrank midway between its opposite ends;

said mounting link connecting said selected bellcrank to said support block includes an eccentric pivot connection adapted to be rotated for positioning said clamping faces with respect to each other; and adjustment means operably connecting said selected bellcrank to said support block via its associated mounting link for adjusting said clamping face of said selected bellcrank with respect to said clamping face of the other bellcrank.